(12) United States Patent
Malon et al.

(10) Patent No.: US 11,428,227 B2
(45) Date of Patent: Aug. 30, 2022

(54) ELECTRICAL ARRANGEMENT ASSEMBLY STRUCTURE ON THE EXTERNAL REGION OF THE HERMETIC HOUSING OF THE COMPRESSOR

(71) Applicant: NIDEC GLOBAL APPLIANCE BRASIL LTDA., Joinville (BR)

(72) Inventors: Vagner Roberto Malon, Joinville (BR); Marcelo Alessandro Santos, Joinville (BR); Rafael Burg Rech, Joinville (BR)

(73) Assignee: NIDEC GLOBAL APPLIANCE BRASIL LTDA., Joinville (BR)

( * ) Notice: Subject to any disclaimer, the term of this patent is extended or adjusted under 35 U.S.C. 154(b) by 280 days.

(21) Appl. No.: 16/695,373

(22) Filed: Nov. 26, 2019

(65) Prior Publication Data

US 2020/0173440 A1    Jun. 4, 2020

(30) Foreign Application Priority Data

Nov. 29, 2018  (BR) ...................... 10 2018 074735 5

(51) Int. Cl.
*F04C 23/00* (2006.01)
*H02K 5/22* (2006.01)

(52) U.S. Cl.
CPC .............. *F04C 23/008* (2013.01); *H02K 5/22* (2013.01); *F04C 2240/803* (2013.01); *F25B 2400/077* (2013.01)

(58) Field of Classification Search
CPC .............. F04C 23/008; F04C 2240/803; F04C 2240/077; H01R 13/506; H01R 13/5213; H01R 12/585; H02K 5/225
See application file for complete search history.

(56) References Cited

U.S. PATENT DOCUMENTS 5,173,057 A * 12/1992 Bunch ................... H01R 13/567
439/217
7,387,519 B2 * 6/2008 Sugiyama ............ H01R 13/506
439/135

(Continued)

FOREIGN PATENT DOCUMENTS

WO   WO 2010/101397 A2   9/2010
WO   WO 2012/035767 A1   1/2014

(Continued)

*Primary Examiner* — Kenneth J Hansen
(74) *Attorney, Agent, or Firm* — Foley & Lardner LLP (57) ABSTRACT

An electrical arrangement assembly is provided on the external region of a hermetic housing of a compressor. The arrangement includes an insulating box capable of housing an electrical interface between internal and external regions of the compressor including an insulating box coupled to the external region by means a hinge element having a pivot handle with an extension and a grounding tab. The grounding tab of the hinge element cooperates with a housing cradle of the insulating box when connecting the box to the housing of the compressor. A controlled angular movement between the insulating box and the hinge element results in electrical connection between a first and second set of electrical terminals of the electrical interface between the internal and external regions of the hermetic housing of the compressor.

7 Claims, 7 Drawing Sheets

(56) References Cited

U.S. PATENT DOCUMENTS

| | | | |
|---|---|---|---|
| 2002/0029469 A1* | 3/2002 | Bunch | F04C 23/008 29/857 |
| 2003/0012669 A1* | 1/2003 | Kawashima | H01R 13/5213 417/423.1 |
| 2011/0008193 A1* | 1/2011 | Park | F04C 23/008 417/417 |

FOREIGN PATENT DOCUMENTS

| | | |
|---|---|---|
| WO | WO 2014/136571 A1 | 9/2014 |
| WO | WO 2016/167409 A1 | 10/2016 |

\* cited by examiner

ELECTRICAL ARRANGEMENT ASSEMBLY STRUCTURE ON THE EXTERNAL REGION OF THE HERMETIC HOUSING OF THE COMPRESSOR

FIELD OF THE INVENTION

The present invention relates to an electrical arrangement assembly structure, preferably a frequency inverter, in the external region of the hermetic housing of a refrigeration compressor. According to the invention in question, said assembly structure aims, as a general objective, to allow a quick, simplified and safe assembly of the electrical arrangement in the external region of the hermetic housing of the compressor.

BACKGROUND OF THE INVENTION

As is well known to those skilled in the art, hermetic compressors, especially those used in refrigeration systems, comprise a hermetic housing within which at least one compression mechanism is enclosed, which includes, among other components, at least one electric motor. In this sense, an electrical interface between the internal region and the external region of the hermetic housing of the compressor is provided, which normally has the function of energizing the electric motor.

In some particular cases, the electric motor is energized by means of an electrical arrangement, which may include an electrical protection circuit, a starting circuit, or a frequency inverter circuit. In these cases, it is common for this electrical arrangement to be coupled to the external region of the compressor housing, in proximity to the electrical interface between the internal region and the external region of the hermetic housing of the compressor.

Generally speaking, the solutions pertaining to the current state of the art use a mechanical coupling.

In this scenario, the electrical arrangement is enclosed in an insulating box, with only its electrical terminals being exposed. Thus, the electrical terminals of the electrical arrangement are connected to the electrical interface between the internal region and the external region of the hermetic housing of the compressor by means of a translational movement. This means that this type of solution (which enables electrical connection of electrical terminals by means of translational motion) is liable to misalignment between the terminals to be connected, after all, the electrical terminals of the electrical arrangement are in a position that is difficult to see due to the insulating box that protects said electrical arrangement. In this manner, if performed manually, the coupling between the electrical terminals of the electrical arrangement and the electrical interface between the internal region and the external region of the hermetic housing of the compressor often requires repeated attempts. In addition, this type of solution still requires the use of screws to secure the insulating box to the external region of the hermetic housing of the compressor, which makes assembly the insulating box even more difficult.

Exemplification of this type of solution can be found in patent documents WO2016167409, WO201235767, WO2014136571 and WO2010101397, which all have characteristics and problems analogous to the aforementioned features and problems.

In addition to the content already described, it is also observed that, as a rule, the insulating boxes (which allow the enclosure of electrical arrangements, usually frequency inverters) belonging to the current state of the art comprise several structural recesses, which end up not completely insulating the electrical arrangements and, in addition, allow insects and moisture to enter, which can accelerate the degradation of electrical arrangements.

In this manner, it is clear that the state of the art lacks solutions that facilitate the assembly of the electrical arrangements disposed in the external region of the hermetic housing of refrigeration compressors, and which also offer greater protection and physical isolation against insects. It is based on this scenario that the invention in question arises.

Goals of the Invention

Thus, the present invention basically aims to solve the problem of assembly of the electrical arrangements disposed in the external region of the hermetic housing of the compressor, promoting an efficient and safe technical solution, with greater structural robustness, greater protection and isolation, besides preventing unwanted entry of insects.

SUMMARY OF THE INVENTION

All the goals of the invention in question are achieved by means of the electrical arrangement assembly structure on the external region of the hermetic housing of the compressor, which comprises at least one insulating box capable of housing, within its internal, at least one electrical arrangement necessary for the operation of the compressor and at least one hinge element fixed to the external region of the hermetic housing of the compressor, in proximity to the electrical terminals of the electrical interface between the internal region and the external region of the hermetic housing of the compressor.

According to the invention in question, said insulating box comprises at least opening of access to the electrical terminals of the electrical arrangement, and at least one housing region. Said hinge element comprises at least one pivot handle. Thus, the housing region of the insulating box and the pivot handle of the hinge element are cooperative with each other in order to enable angular movement between said insulating box and said hinge element.

Thus, the end of the angular movement between the insulating box and the hinge element results in the electrical connection between the electrical terminals of the electrical arrangement and the electrical terminals of the electrical interface between the internal region and the external region of the hermetic housing of the compressor.

According to a preferred embodiment of the invention the hinge element comprises a hole, wherein the electrical interface between the internal region and the external region of the hermetic housing of the compressor is disposed within the interior of said hole. The access opening to the electrical terminals of the electrical arrangement of the insulating box comprises shape and dimensions analogous to the shape and dimensions of the hole of the hinge element.

It is also provided at least one sealing means, insulating box opening and the electrical interface.

As a possible embodiment, the sealing means comprises a gasket which is housed in a channel existing in the contact face of the contouring wall of the insulating box opening.

In another possible embodiment, the sealing means is defined by the physical contact between a contour rib disposed on the contact face of the contour wall of the insulating box opening and the hinge element.

Preferably, the maintenance of the position of the insulating box with respect to the hinge element is maintained by cooperation between the locking tab of the hinge element and an engaging portion of the insulating box, and optionally, this cooperation also has a fixing element capable of traversing said locking tab and said engaging region.

BRIEF DESCRIPTION OF THE FIGURES

The preferred embodiment of the invention in question is described in detail on the basis of the listed figures, which are merely exemplary and not limiting, as adaptations and modifications may be made without thereby departing from the general scope of the invention in question.

DETAILED DESCRIPTION OF THE INVENTION

As illustrated in the figures, the present invention relates to an electrical arrangement assembly structure in the external region of the hermetic housing of a refrigeration compressor, which is fundamentally integrated by an insulating box 1 and a hinge element 2.

Figure 3:
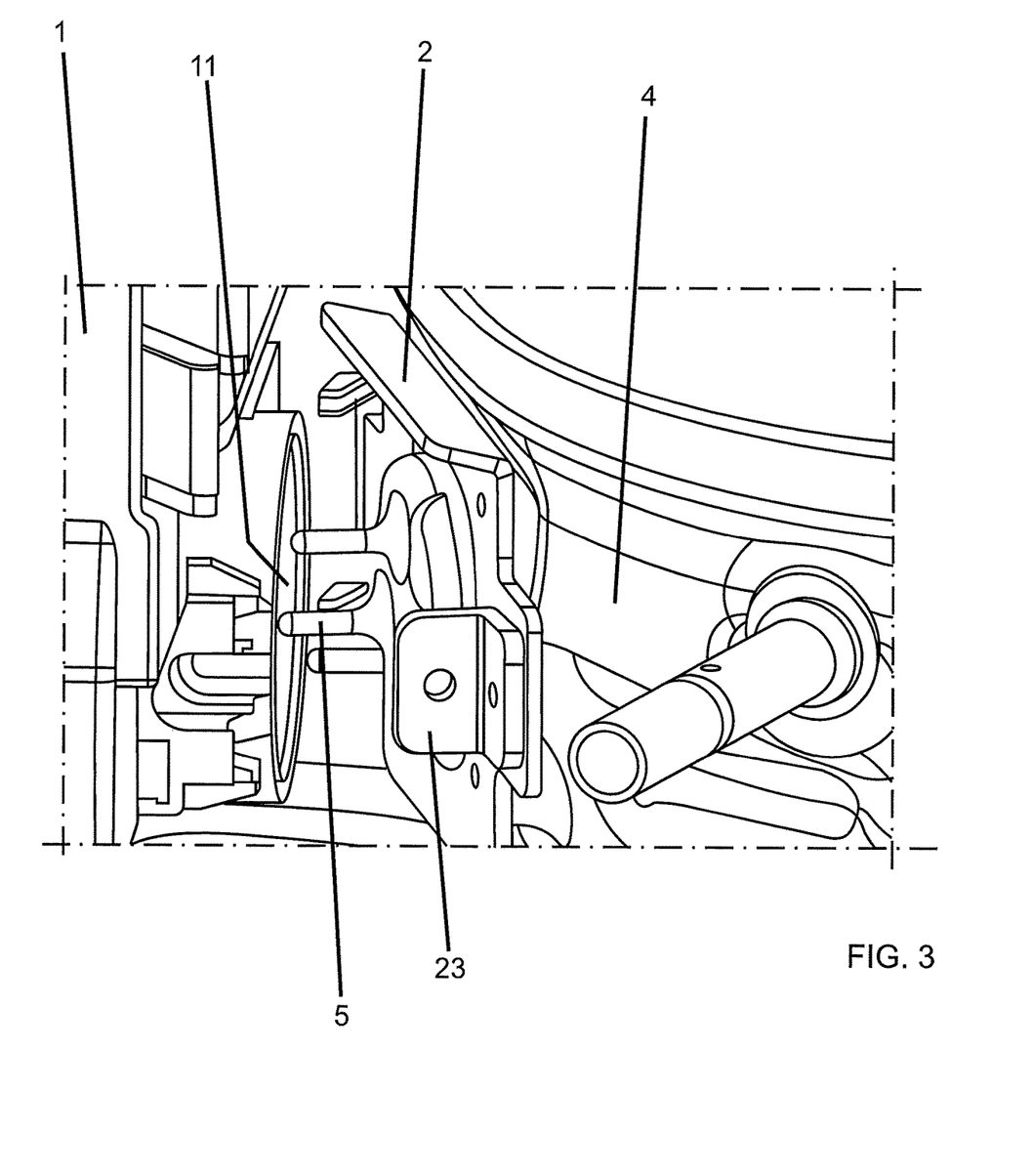
FIG. 3 is intended to illustrate, in a static manner, the pivoting movement of the hinge element for engaging the electrical arrangement assembly structure.
Figure 4:
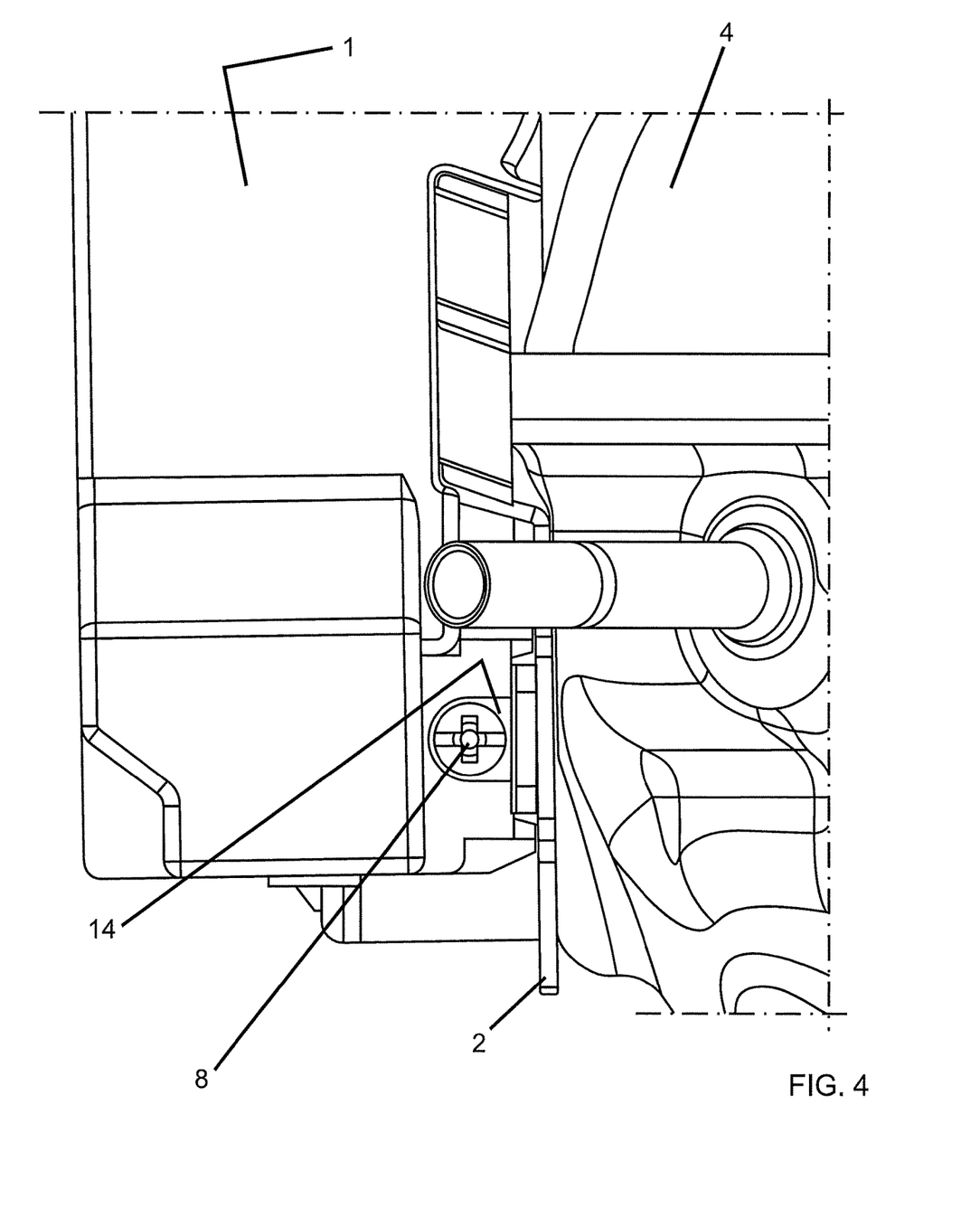
FIG. 4 illustrates, in enlarged detail, the electrical arrangement assembly structure properly coupled to the external region of the hermetic housing of the compressor.

The cooperation between the insulating box 1 and hinge element 2 allows the electrical connection between the electrical terminals 3 of the electrical arrangement (existing inside the insulating box 1) and the electrical terminals 5 available in the hermetic housing 4 of the compressor to occur by means of a pivoting motion, as shown in FIG. 3.

Figure 1:
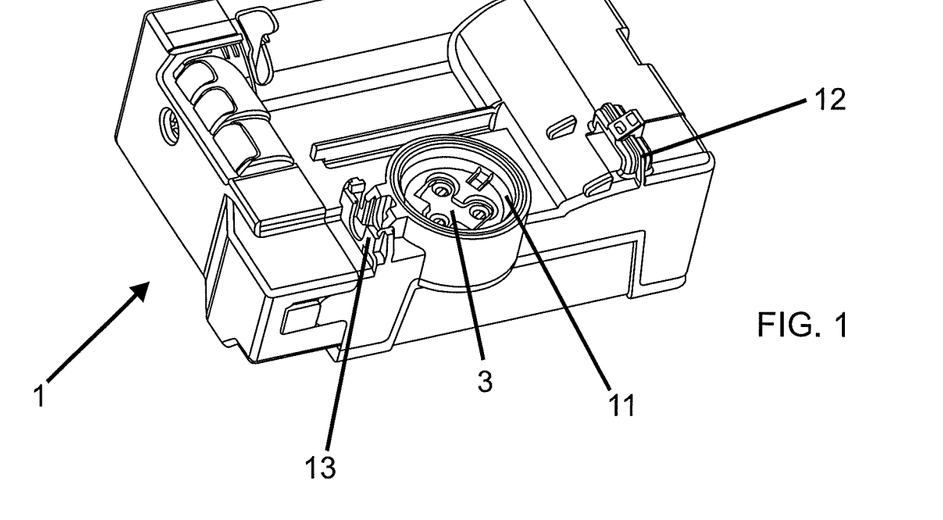
FIG. 1 illustrates the electrical arrangement assembly structure according to the present invention.

As shown in FIG. 1, the insulating box 1, especially suitable for enclosing an electrical arrangement (not shown), comprises a body which, made of electrical insulating material, comprises an opening 11 dedicated to exposing the electrical terminals 3 of the electrical arrangement, a housing region 12 dedicated for receiving a portion of the hinge element 2, and a housing cradle 13 for an electrical grounding terminal 14.

Said opening 11 comprises a circular contour, which is especially suited to the electrical interface supporting the electrical terminals 5 of the compressor.

Figure 2:
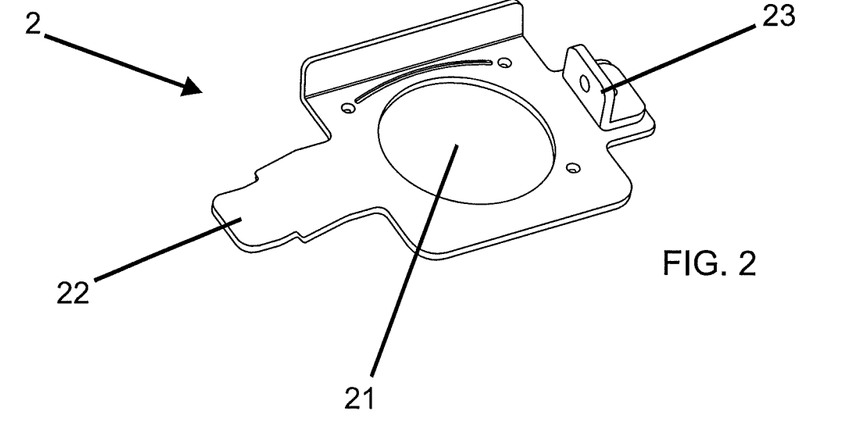
FIG. 2 illustrates the hinge element according to the present invention.

As shown in FIG. 2, the hinge element 2 comprises a rigid plate provided with a hole 21, a pivot handle 22 and a grounding tab 23.

As occur with the opening 11 of the insulating box 1, the hole 21 of the hinge element 2 also comprises a circular contour, which is especially suited to the electrical interface supporting the electrical terminals 5 of the compressor. The pivot handle 22 adequate to be housed in the housing region 12 of the insulating box 1 comprises an extension arranged in the same general plane as the hinge element 2. The grounding tab 23 adequate for cooperation with the housing cradle 13 (and with the electrical grounding terminal 14), comprising an extension perpendicular to the general plane of the hinge element 2.

For purposes of descriptive sufficiency, the compressor—preferably, but not limited to—suitable for refrigeration systems, comprises a hermetic housing 4 in whose interior is arranged a functional compression mechanism fundamentally integrated by a cylinder-piston mechanism and by an electric motor. Said compressor further comprises an electrical interface between the internal region and the external region of the hermetic housing 4, being that said electric interface supports the electrical terminals 5 of the compressor, which have electrical connection with the motor disposed in the interior the hermetic housing 4.

Figure 5:
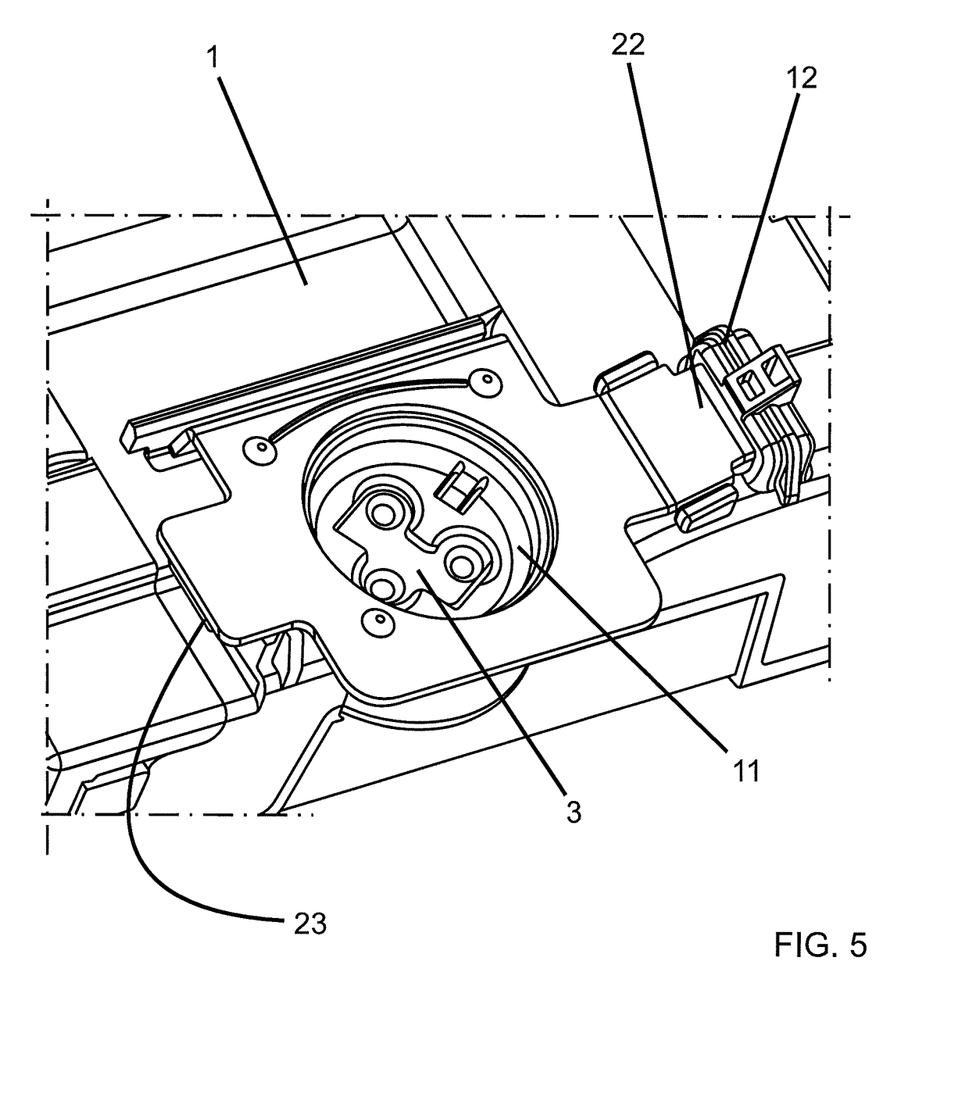
FIGS. 5 and 6 illustrate the physical cooperation between the electrical arrangement assembly structure shown in FIG. 1, and the hinge element shown in FIG. 2 (in these figures, for better understanding, the compressor is not shown).
Figure 6:
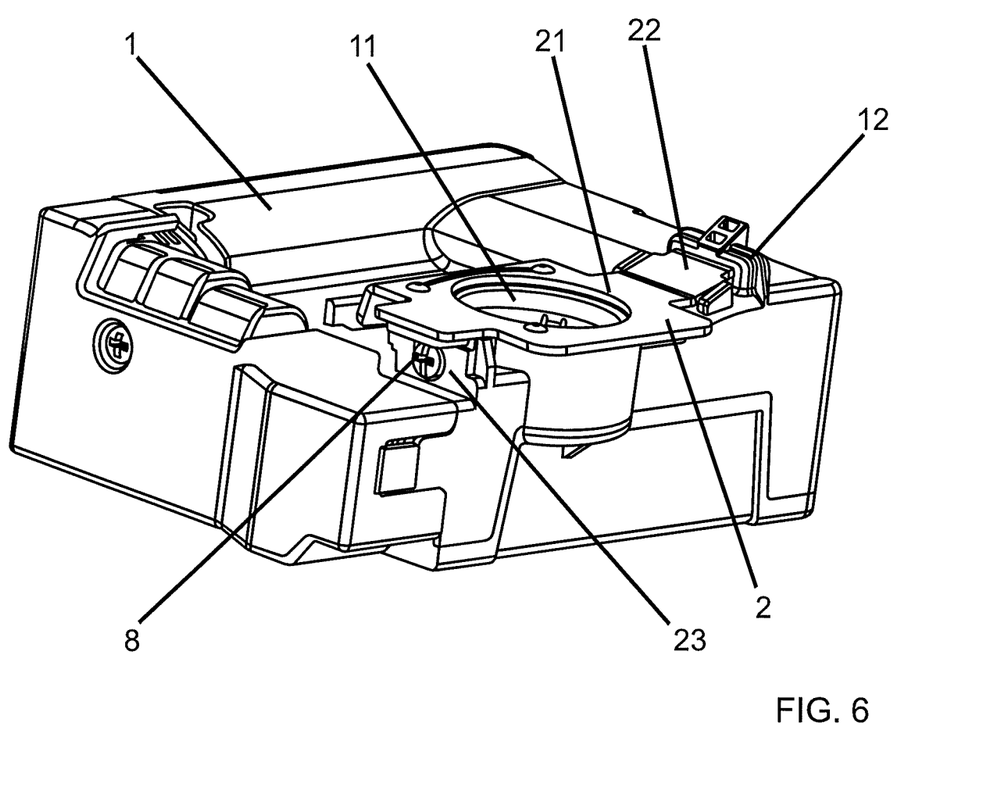

As shown in FIGS. 5 and 6, it is noted that the hinge element 2 is fixed to the external region of the hermetic housing 4 so that its hole 21 is housed around the electrical interface. This fixation is watertight, and the hinge element 2 and hermetic housing 4 do not perform any type of relative movement between them. The pivot handle 22 of the hinge element 2 is housed in the housing region 12 of the insulating box 1. This housing allows the insulating box 1 to develop controlled angular movement with respect to the hinge element 2 and, hence, in relation to the hermetic housing 4. The physical embodiment of the fit between the pivot handle 22 of the hinge element 2 and the housing region 12 of the insulating box 1 may be any that permits angular (and pivoting) movement between these two coupling points. Of course, the length of the pivot handle 22 of the hinge element 2 and the positioning of the housing region 12 of the insulating box 1 are such that they allow, in a final coupling position between the electrical terminals 3 of the electrical arrangement contained within the insulating box 1 and the electrical terminals 5 of the compressor, the alignment between the opening 11 of the insulating box 1 and the electrical interface.

Therefore, one of the merits of the invention in question is to create a kind of momentum guide (angular movement) for coupling between the electrical terminals 3 of the electrical arrangement contained within the insulating box 1 and the electrical terminals 5 of the compressor, this movement guide being defined by details of dimension and positioning of the pivot handle 22 of the hinge element 2 and the housing region 12 of the insulating box 1. This construction, which defines a pivoting means between the insulating box 1 and the hermetic housing 4 is surely responsible for optimizing all the assembly issues previously quoted and present in the solutions that integrate the current state of the art.

Another of the merits of the invention in question is achieved by the possibilities of sealing means existing between the opening 11 of the insulating box 1 and the electrical interface 5, as illustrated in FIGS. 7, 8, 9 and 10.

Figure 7:
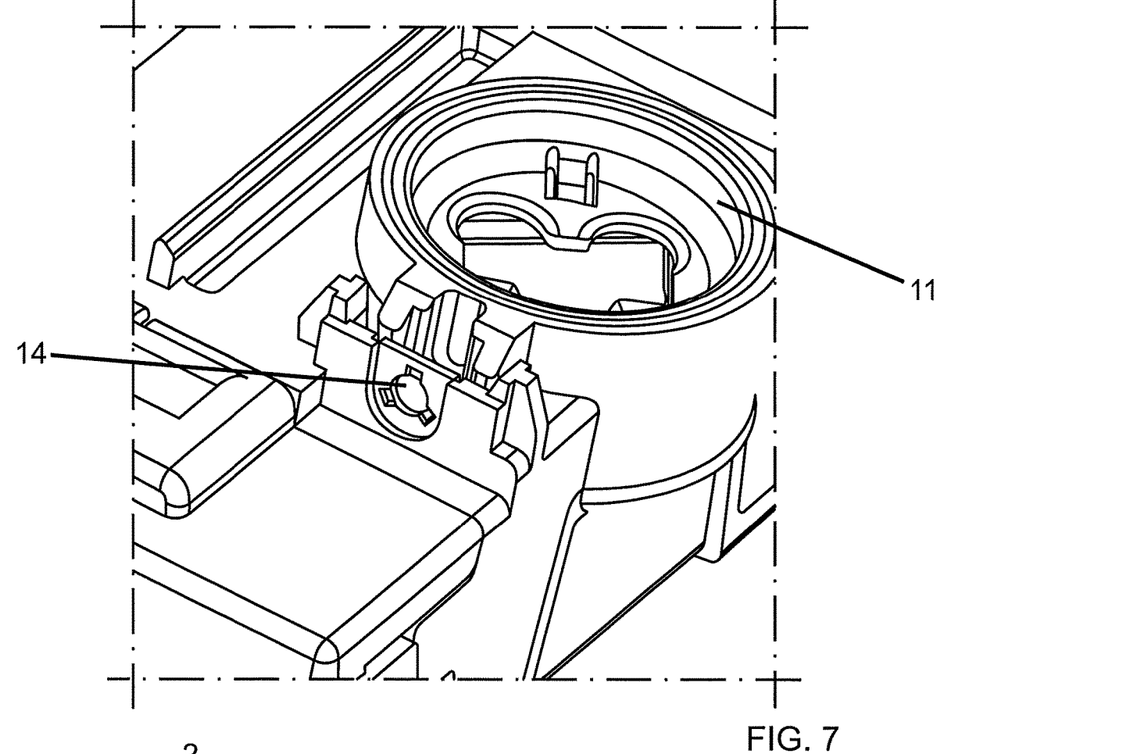
FIGS. 7 and 9 illustrate possible embodiments of the electrical arrangement sealing means in accordance with the present invention.
Figure 8:
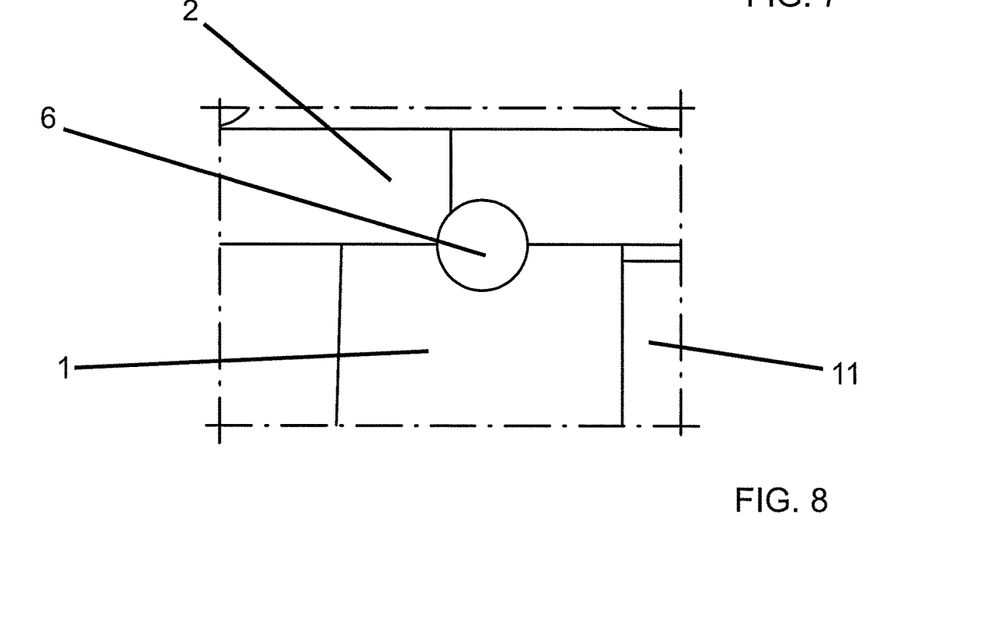
FIGS. 8 and 10 illustrate, in enlarged sections, details of the possible embodiments of the electrical arrangement sealing means.

In FIGS. 7 and 8, it is noted that one of the possibilities of sealing means between the opening 11 of the insulating box 1 and the electrical interface is the application of a gasket 6, preferably of the o'ring type, between the contact region of the opening 11 of the insulating box 1 and the electrical interface 5. For this purpose, the opening 11 of the insulating box 1 has a contour wall whose contact face has a channel especially suitable for retaining the gasket 6. In the end position—coupling between the electrical terminals 3 of the electrical arrangement contained within the insulating box 1 and the electrical terminals 5 of the compressor—gasket 6, in contact with the hinge element 2, prevents access (of insects, for example) to the interior of the insulating box 1.

Figure 9:
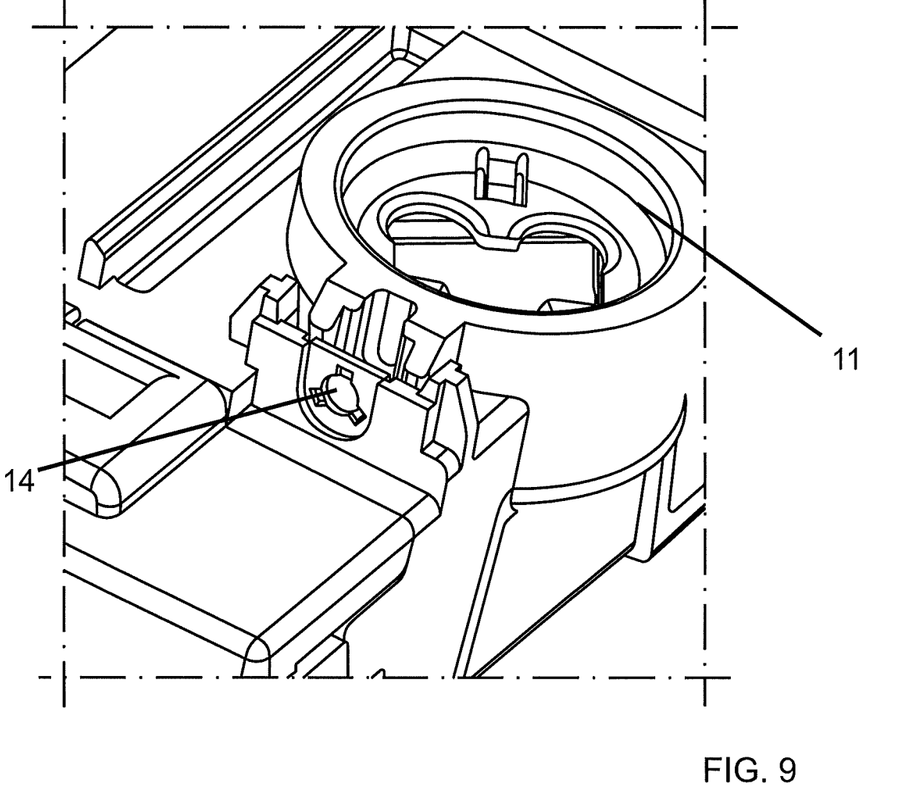
Figure 10:
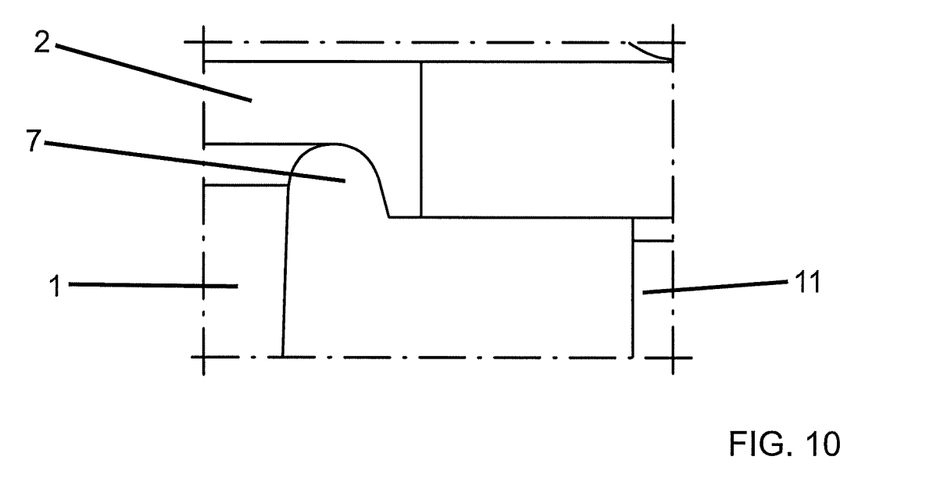

In FIGS. 9 and 10, it is noticed that one of the possibilities of sealing means between the opening 11 of the insulating box 1 and the electrical interface is the application of the concept of "maze", in which the opening 11 of the insulating box 1 has a contour wall whose contact face has a contour rib 7 of diameter slightly smaller than the diameter of the hole 21 of the hinge element 2, and in the end position—coupling between the electrical terminals 3 of the electrical arrangement contained within the insulator box 1 and the electrical terminals 5 of the compressor—the contour rib 7 combined with the hinge element 2 prevents access (of insects, for example) to the interior of the insulator box 1.

The positioning of the insulating box 1 in relation to the hinge element 2 and, consequently, in relation to the hermetic housing 4 is maintained by cooperation between the housing cradle 13 (and its electrical grounding terminal 14) of the insulating box 1 and the grounding tab 23 of the hinge element 2. The physical and electrical connection between these elements can be optimized by inserting, for example, a metal screw 8.

It is important to emphasize that the above description is intended solely to describe, in an exemplary way, the particular embodiment of the invention in question. Therefore, it is clear that modifications, variations and constructive combinations of elements that perform the same function, in substantially the same way, to achieve the same results, remain within the scope of protection delimited by the appended claims.

The invention claimed is:

1. An electrical arrangement assembly on an external region of a hermetic housing of a compressor, comprising:
   at least one insulating box capable of accommodating at least one electrical arrangement necessary for operation of the compressor, said insulating box comprising at least an opening for access to a first set of electrical terminals of the electrical arrangement, at least one housing region, and a housing cradle;
   at least one hinge element fixed to the external region of the hermetic housing of the compressor, arranged relative to a second set of electrical terminals of an electrical interface between an internal region and the external region of the hermetic housing of the compressor; said hinge element comprising at least one pivot handle, said at least one pivot handle comprising an extension;
   the housing region of the insulating box and the pivot handle of the hinge element being cooperative with each other by means of the cooperation between the housing cradle and a grounding tab, enabling a controlled angular movement between said insulating box and said hinge element when connecting the insulating box to the hermetic housing of the compressor,
   wherein an end of the controlled angular movement between the insulating box and the hinge element results in electrical connection between the first set of electrical terminals of the electrical arrangement and the second set of electrical terminals of the electrical interface between the internal region and the external region of the hermetic housing of the compressor.

2. The assembly according to claim 1, wherein the hinge element comprises a hole, with the electrical interface between the internal region and the external region of the hermetic housing of the compressor disposed in an interior of said hole.

3. The assembly according to claim 1, wherein the opening for access to the first set of electrical terminals of the electrical arrangement of the insulating box is formed in a shape with dimensions corresponding to the shape and dimensions of a hole of the hinge element.

4. The assembly according to claim 1, further comprising at least one seal provided in the opening of the insulating box and the electrical interface.

5. The assembly according to claim 4, wherein the at least one seal comprises a gasket;
   said gasket is housed in a channel existing in a contact face of the housing cradle of the opening of the insulating box.

6. The assembly according to claim 4, wherein the at least one seal is defined by physical contact between a contour rib disposed on the contact face of the housing cradle of the opening of the insulating box and the hinge element.

7. The assembly according to claim 6, wherein cooperation between the grounding tab of the hinge element and an engaging portion of the insulating box is facilitated by a fixing element capable of traversing said grounding tab and said engaging portion.

* * * * *